United States Patent [19]
Nail

[11] Patent Number: 5,604,504
[45] Date of Patent: Feb. 18, 1997

[54] AIR TRAFFIC ADVISORY SYSTEM BEARING ESTIMATION RECEIVER

[75] Inventor: David L. Nail, Stilwell, Kans.

[73] Assignee: AlliedSignal Inc., Morristown, N.J.

[21] Appl. No.: 518,934

[22] Filed: Aug. 24, 1995

[51] Int. Cl.$^6$ ............................ G01S 5/02; G01S 13/00
[52] U.S. Cl. .................... 342/417; 342/29; 342/147; 342/427; 342/454
[58] Field of Search ...................... 342/424, 152, 342/149, 427, 147, 153, 454, 417, 442, 29

[56] References Cited

U.S. PATENT DOCUMENTS

| | | | |
|---|---|---|---|
| 3,346,861 | 10/1967 | Chadwick et al. | 342/153 |
| 4,438,436 | 3/1984 | Murphy | 342/153 |
| 4,855,748 | 8/1989 | Brandao et al. | 342/455 |
| 5,402,130 | 3/1995 | Sherman | 342/152 |

*Primary Examiner*—Gregory C. Issing

[57] ABSTRACT

In an air traffic advisory system for determining the bearing of an intruder aircraft relative to a protected aircraft, the preferred apparatus determines a corrected bearing to compensate for bearing errors caused by intruder signal reflections. More particularly, the preferred apparatus uses a hybrid combiner to produce a sum, delta one and delta two signals, and determines the phase relationship between the sum signal and each of the delta signals, the two phase relationships being subject to at least partially offsetting errors due to intruder signal reflections. The apparatus determines an uncorrected intruder bearing from each phase relationship and then averages the uncorrected bearings to produce a corrected intruder bearing.

14 Claims, 1 Drawing Sheet

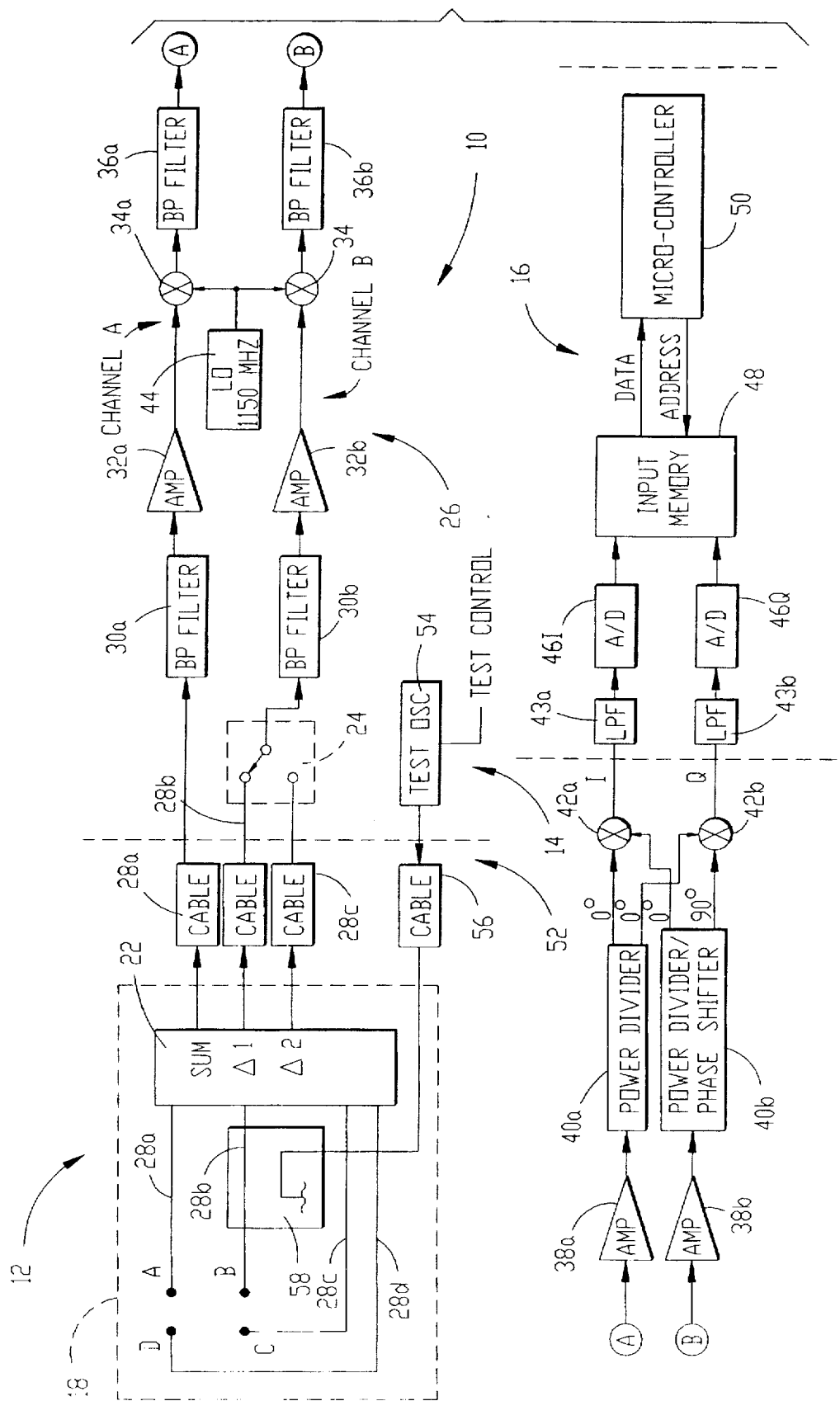

AIR TRAFFIC ADVISORY SYSTEM BEARING ESTIMATION RECEIVER

BACKGROUND OF THE INVENTION

1. Field of the Invention

The present invention relates to bearing estimation receiver for an air traffic advisory system such as TCAS or TAS for determining the bearing of an intruder aircraft relative to a protected aircraft. More particularly, the invention is concerned with an apparatus for determining a corrected bearing to compensate for bearing errors caused by intruder signal reflections.

2. Description of the Prior Art

In the field of bearing estimation receivers for air traffic advisory systems, a multi-antenna array located aboard a protected aircraft is used to receive intruder signals from an intruder aircraft in response to interrogations from equipment located aboard the protected aircraft. A signal processing unit coupled with the antenna array processes the antenna signals to determine the intruder bearing relative to the protected aircraft.

Various surfaces on the protected aircraft such as the tail, engine cowlings and other antennas produce reflected intruder signals, which are also received by the antenna array. These reflected intruder signals combine with the signals received directly from the intruder aircraft and cause errors in the intruder bearing as determined by the signal processing unit. Also, imperfections within the antenna itself can result in errors in bearing. As those skilled in the art appreciate, an accurately determined intruder bearing is important for avoiding collisions. Accordingly, the prior art points out the need for a more accurate intruder bearing information for the pilot of a protected aircraft.

SUMMARY OF THE INVENTION

The present invention solves the prior art problems discussed above and provides a distinct advance in the state of the art. More particularly, the TCAS apparatus hereof provides bearing information corrected for errors caused by intruder signal reflections.

The preferred apparatus includes an array of antennas and a signal processor mounted aboard the protected aircraft. The antennas are operable for receiving intruder signals and for producing respective antenna signals. The signal processor includes a signal combiner, a signal receiver, and a computer circuit for bearing determination.

The signal combiner produces a sum signal, a first delta signal and a second delta signal. The receiver produces first and second phase signals representative of the phase relationships between the sum signal and each of the delta signals. Each of the phase signals is representative of the intruder bearing, but subject to error due to intruder signal reflections. The signal combiner is configured to produce the first and second delta signals so that the errors in the first and second phase signals are at least partially offsetting.

The computer circuit determines a corrected intruder bearing as a function of the first and second phase signals. In the preferred embodiment, the computer circuit determines an uncorrected intruder bearing from each of the phase signals and then produces the corrected bearing as the average of the two uncorrected bearings.

BRIEF DESCRIPTION OF THE DRAWING

The single drawing FIGURE is a block diagram representing the preferred apparatus constructed in accordance with the present invention.

DETAILED DESCRIPTION OF THE PREFERRED EMBODIMENT

Preferred TCAS apparatus 10 includes antenna array 12, receiver 14 and computer circuit 16. Antenna array 12 is preferably a conventional twin blade, omni-directional, four-element interferometer antenna. Array 12 includes housing 18 composed of glass reinforced, thermoset plastic enclosing antennas A, B, C and D which are operable for producing respective antenna signals A, B, C and D on lines 20a, 20b, 20c and 20d in response to intruder signals.

Antenna array 12 also includes hybrid combiner 22, located within housing 18 and coupled with lines 20a–d for receiving respective antenna signals A–D. In response to the antenna signals, combiner 22 produces output signals as SUM, DELTA 1 and DELTA 2 on coaxial cables 28a, 28b and 28c. The combiner output signals can be represented as:

SUM=A+B+C+D,

DELTA 1=A–jB–C+jD, and

DELTA 2=A+jB–C–jD where A, B, C and D represent the antenna signals and j represents a 90° phase shift. Combiner 22 is composed of circuitry for four hybrid couplers etched on a printed circuit board and interconnected to produce the outputs described in the above equations.

Receiver 14 includes switch 24 and receiver circuit 26. Receiver circuit 26 and computer circuit 16 are preferably conventional TCAS 1090 MHz receiver system components such as those available from AlliedSignal, Inc. of Olathe, Kans. as part of models TPU66A or TPU67A. Receiver circuit 26 includes channel A and channel B. Channel A receives the SUM signal as input on cable 28a. Cables 28b and 28c provide the DELTA 1 and DELTA 2 signals to conventional electronic switch 24 which is controlled by computer circuit 16. In turn, switch 24 alternately provides the DELTA 1 and DELTA 2 signals to channel B by way of line 30.

Channel A includes series-coupled 1090 MHz bandpass filter 30a, r.f. amplifier 32a, mixer 34a, 60 MHz bandpass filter 36a, i.f. amplifier 38a, power divider 40a and phase detector 42a. Channel B includes series-coupled 1090 MHz bandpass filter 30b, r.f. amplifier 32b, mixer 34b, 60 MHz bandpass filter 36b, i.f. amplifier 38b, power divider 40b and phase detector 42b. Oscillator 44 provides mixing signals at 1150 MHz to mixers 34a and 34b for producing respective intermediate frequency outputs centered on 60 MHz.

Phase detector 42a receives one input from power divider 40a representative of the SUM signal at 0° phase shift and a second input at 0° phase shift from power divider 40b representative of the DELTA 1 signal or the DELTA 2 signal, depending upon the position of switch 24. In response, detector 42a produces a D.C. output I (In-phase signal) representative of the phase relationship of the SUM and DELTA 1 signals as a first phase signal when switch 24 is in one position. In the other position of switch 24, detector output I represents the phase relationship of the SUM and DELTA 2 signals as a second phase signal.

Similarly, phase detector 42b receives one input from power divider 40a at 0° phase shift representative of the SUM signal and a second input from power divider 40b representative of the DELTA 1 or DELTA 2 signals according to the position of switch 24. The input from power divider 40b, however, is shifted 90°. As a result, output signal Q (Quadrature signal) from detector 42b represents a 90° shift in the phase relationships of the DELTA 1/SUM and DELTA 2/SUM signals. The Q signal is produced and used with the I signal because the phase quadrant of the I signal alone is indeterminate to identify the phase quadrant.

Computer circuit 16 includes low-pass filters 43a and 43b, analog-to-digital (A/D) converters 46I and 46Q, input memory 48 and microcontroller 50. Filters 43a,b receive the respective I and Q signals from phase detectors 42a,b and pass only the D.C. components which are converted to digital values by converters 46I, Q and stored in memory 48. These digital values are supplied as data for processing by microcontroller 50.

The bearing of an intruder aircraft relative to the protected aircraft can be derived from the first and second phase signals produced by phase detectors 42a and 42b. These phase signals, however, are subject to error due to reflections of the intruder signals by surfaces near antenna 12. These surfaces can include the protected aircraft tail, engine cowlings and other antennas, for example. These reflected intruder signals combine with the signals received directly from the intruder aircraft and subject the antenna signals A–D to errors in magnitude and phase.

Because of the antenna signal errors, an intruder bearing derived from either of the first and second phase signals may include an error component. By configuring hybrid combiner 22 in accordance with the present invention to present the values for DELTA 1 and DELTA 2 described above, the errors in the first and second phase signals from phase detectors 42a and 42b are at least partially offsetting. To take advantage of this, microcontroller 50 determines a corrected bearing as a function of both first and second phase signals. More particularly, microcontroller 50 is programmed to determine a first, uncorrected intruder bearing from the first phase signal and a second, uncorrected intruder bearing from the second phase signal. Microcontroller 50 determines the first uncorrected intruder bearing as −1 times the inverse tangent of the ratio Q/I using DELTA 1. Similarly, the second uncorrected intruder bearing is determined as the inverse tangent of the ratio Q/I using DELTA 2. Microcontroller 50 then determines the average of the first and second, uncorrected intruder bearings as the corrected intruder bearing.

Apparatus 10 also includes calibration circuit 52 which includes test oscillator 54 operable for producing a test signal at 1090 MHz which is carried by cable 56 to coupler 58 located within antenna housing 18 and positioned to provide the test signal to antenna B. Oscillator 54 is under the control of computer circuit 16. During calibration, only antenna B receives the test signal. As a result, the DELTA 1 signal is phase shifted −90° relative to the SUM signal, and DELTA 2 is phase shifted +90° relative to the SUM signal. Any deviations from these values from phase detector 42a are stored in memory 48 as error correction data for use in determining the corrected intruder bearing.

Those skilled in the art will appreciate that the present invention encompasses many variations in the preferred embodiment enclosed herein. For example, other equations for DELTA 1 and DELTA 2 could be used and, separate receivers could be provided for each DELTA signal.

Having thus described the preferred embodiment of the present invention, the following is claimed as new and desired to be secured by Letters Patent:

1. In a traffic advisory system wherein an intruder aircraft is equipped for transmitting intruder signals and wherein a protected aircraft is equipped for receiving the intruder signals and determining therefrom the intruder bearing as the bearing angle of the intruder aircraft relative to the protected aircraft, the intruder bearing being subject to error, an apparatus for determining a corrected intruder bearing, said apparatus comprising:

an array of antennas mounted aboard the protected aircraft, said antennas being operable for receiving the intruder signals and responsive thereto for producing respective antenna signals; and signal processing means for receiving and processing said antenna signals for determining the bearing of the intruder aircraft relative to the protected aircraft, said signal processing means including signal combining means including means for producing a sum signal representative of the sum of selected antenna signals, and means for producing a first delta signal representative of the differences of selected antenna signals, receiving means for producing a first phase signal representative of the phase relationship between said sum and first delta signals, said first phase signal being representative of a first intruder bearing and being subject to error due to intruder signal reflection, said signal combining means including means for producing a second delta signal representative of the differences of selected antenna signals, said receiving means including means for producing a second phase signal representative of the phase relationship between said sum and second delta signals, said second phase signal being representative of a second intruder bearing and being subject to error due to intruder signal reflection, said signal combining means including means for producing said first and second delta signals so that said errors of said first and second phase signals are at least partially offsetting, said signal processing means further including bearing determining means for determining a corrected bearing as a function of both said first and second phase signals.

2. The apparatus as set forth in claim 1, said antenna array including four of said antennas.

3. The apparatus as set forth in claim 2, the protected aircraft presenting a heading axis, two of said antennas being positioned on one side of said axis and the other two of said antennas being positioned on the opposed side of said axis.

4. The apparatus as set forth in claim 2, said antenna array including four of said antennas producing respective antenna signals as signals A, B, C and D.

5. The apparatus as set forth in claim 4, said sum signal being represented by A+B+C+D.

6. The apparatus as set forth in claim 4, said first delta signal being represented as A−jB−C+jD where j represents a phase shift of 90°.

7. The apparatus as set forth in claim 4, said second delta signal being represented as A+jB−C−jD where j represents a phase shift of 90°.

8. The apparatus as set forth in claim 1, said bearing determining means including means for deriving a first intruder bearing as a function of said first phase signal, for deriving a second intruder bearing as a function of said second phase signal, and for determining said corrected bearing as the average of said first and second intruder bearings.

9. The apparatus as set forth in claim 1, said signal combining means including a hybrid combiner.

10. The apparatus as set forth in claim 9, said apparatus including a housing enclosing said hybrid combiner and said array, said hybrid combiner and said array being positioned within said housing.

11. The apparatus as set forth in claim 1, said antennas producing said respective antenna signals as signals A, B, C and D, said sum signal being represented by A+B+C+D, said first delta signal being represented as A+jB−C−jD, said second delta signal being represented as A−jB−C+jD, where j represents a phase shift of 90°, and said bearing determining means including means for deriving a first intruder bearing as a function of said first phase signal, for deriving a second intruder bearing as a function of said second phase signal, and for determining said corrected bearing as the average of said first and second intruder bearings.

12. The apparatus as set forth in claim 1, said receiving means including a first channel for processing said sum signal, a second channel for processing said delta signals, and a switch between said array and said second channel for alternately providing said first and second delta signals to said second channel.

13. The apparatus as set forth in claim 1, said signal combining means including a hybrid combiner having a plurality of hybrid couplers.

14. The apparatus as set forth in claim 1, said signal combining means including a hybrid combiner, said apparatus including a housing enclosing said array, said hybrid combiner being positioned within said housing, said antenna array including four of said antennas, the protected aircraft presenting a heading axis, two of said antennas being positioned on one side of said axis and the other two of said antennas being positioned on the opposed side of said axis, said antennas producing said respective antenna signals as signals A, B, C and D, said sum signal being represented by A+B+C+D, said first delta signal being represented as A+jB−C−jD, said second delta signal being represented as A−jB−C+jD, where j represents a phase shift of 90°, and said bearing determining means including means for deriving a first intruder bearing as a function of said first phase signal, for deriving a second intruder bearing as a function of said second phase signal, and for determining said corrected bearing as the average of said first and second intruder bearings, said receiving means including a first channel for processing said sum signal, a second channel for processing said delta signals, and a switch between said array and said second channel for alternately providing said first and second delta signals to said second channel.

\* \* \* \* \*